US009715140B2

United States Patent
Lee et al.

(10) Patent No.: US 9,715,140 B2
(45) Date of Patent: Jul. 25, 2017

(54) LIQUID CRYSTAL DISPLAY APPARATUS HAVING CIRCUIT BOARD INSTALLED IN REAR CHASSIS

(71) Applicant: SAMSUNG ELECTRONICS CO., LTD., Suwon-si (KR)

(72) Inventors: Kye-hoon Lee, Suwon-si (KR); Jin Liu, Suwon-si (KR); Won-yong Lee, Suwon-si (KR); Suk-ju Choi, Jeonju-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 149 days.

(21) Appl. No.: 14/516,083

(22) Filed: Oct. 16, 2014

(65) Prior Publication Data
US 2015/0103288 A1    Apr. 16, 2015

(30) Foreign Application Priority Data

Oct. 16, 2013  (KR) .................. 10-2013-0123346

(51) Int. Cl.
*G02F 1/1335*    (2006.01)
(52) U.S. Cl.
CPC ............ *G02F 1/133608* (2013.01); *G02F 2001/133612* (2013.01); *G02F 2001/133628* (2013.01)
(58) Field of Classification Search
CPC ... G02F 2001/133628; G02F 1/133608; G02F 2001/133612; G02F 1/133615; G02F 1/13452; G02F 1/133602; G02B 6/0085; G02B 6/0091; H04N 3/127
See application file for complete search history.

(56) References Cited

U.S. PATENT DOCUMENTS

| 2001/0053072 A1* | 12/2001 | Takemoto ......... G02F 1/133606 362/613 |
| 2007/0171353 A1* | 7/2007 | Hong ............... G02F 1/133603 349/161 |
| 2012/0050647 A1 | 3/2012 | Chen et al. |

(Continued)

FOREIGN PATENT DOCUMENTS

| EP | 2154564 A2 | 2/2010 |
| KR | 10-2012-0073074 A | 7/2012 |

(Continued)

OTHER PUBLICATIONS

Communication dated Oct. 18, 2016, issued by the European Patent Office in counterpart European Application No. 14186923.0.

(Continued)

*Primary Examiner* — Huyen Ngo
(74) *Attorney, Agent, or Firm* — Sughrue Mion, PLLC

(57) ABSTRACT

A liquid crystal display apparatus includes a liquid crystal panel configured to display images; at least one light source configured to supply light to the liquid crystal panel; a front chassis member and a rear chassis member configured to accommodate the liquid crystal panel and the light source module and a circuit board configured to control the liquid crystal display apparatus. The rear chassis member may include a light source supporting portion supporting the at least one light source and a plurality of side surface portions extending from the light source supporting portion to the rear chassis member. The circuit board may be disposed in at least one of the side surface portions.

20 Claims, 11 Drawing Sheets

(56) References Cited

U.S. PATENT DOCUMENTS

2012/0092568 A1* 4/2012 Yokota .............. G02F 1/133608
                                                      348/790
2012/0106122 A1   5/2012 Ryu et al.
2012/0170253 A1   7/2012 Park et al.
2016/0209580 A1*  7/2016 Hosoki .............. G02F 1/13452

FOREIGN PATENT DOCUMENTS

KR   10-2012-0079651 A   7/2012
KR   10-2013-0049895 A   5/2013

OTHER PUBLICATIONS

International Search Report dated Nov. 17, 2014 issued by International Searching Authority in counterpart International Patent Application No. PCT/KR2014/006805.
Written Opinion dated Nov. 17, 2014 issued by International Searching Authority in counterpart International Patent Application No. PCT/KR2014/006805.
Communication dated Dec. 2, 2014 issued by European Patent Office in counterpart European Patent Application No. 14186923.0.

* cited by examiner

LIQUID CRYSTAL DISPLAY APPARATUS HAVING CIRCUIT BOARD INSTALLED IN REAR CHASSIS

CROSS-REFERENCE TO RELATED APPLICATIONS

This application claims priority from Korean Patent Application No. 2013-0123346, filed in the Korean Intellectual Property Office on Oct. 16, 2013, the disclosure of which is incorporated herein by reference, in its entirety.

BACKGROUND

1. Field

Aspects of the exemplary embodiments relate to a liquid crystal display apparatus. More particularly, the exemplary embodiments relate to a direct type liquid crystal display apparatus.

2. Description of the Related Art

A flat panel display apparatus is a thin and lightweight image display apparatus. Recently, liquid crystal display apparatuses are becoming mainstream in the market of flat panel display apparatuses.

The liquid crystal display apparatuses are classified into an edge type display apparatus and a direct type display apparatus depending on the arrangement of a light source module. An edge type display apparatus is a liquid crystal display apparatus with a light source module disposed in a side surface of a liquid crystal panel. A direct type display apparatus is a liquid crystal display apparatus with a light source module disposed in the rear of the liquid crystal panel. In a direct type display apparatus, it is easier to keep the screen brightness uniform than in an edge type display apparatus because light source packages, such as light emitting diodes (LEDs), are uniformly provided in the rear of the liquid crystal panel.

Accordingly, there is a growing tendency that liquid crystal display apparatuses are designed as direct type display apparatuses. There is also a trend to gradually make the display apparatuses slimmer.

SUMMARY

Exemplary embodiments overcome the above drawbacks and other problems associated with the conventional arrangement. An aspect of the exemplary embodiments is to provide a slimmer liquid crystal display apparatus according to the slimming trend.

In one aspect of the exemplary embodiments a liquid crystal display apparatus is provided, which includes a liquid crystal panel configured to display images; at least one light source configured to supply light to the liquid crystal panel; a front chassis member and a rear chassis member configured to accommodate the liquid crystal panel and the light source; and at least one circuit board configured to control the liquid crystal display apparatus. The rear chassis member may include a light source supporting portion supporting the at least one light source; and a plurality of side surface portions extending from the light source supporting portion to the rear chassis member. The at least one circuit board may be disposed in at least one of the plurality of side surface portions.

A distance between each of the at least one circuit board and the liquid crystal panel may be shorter than a distance between the liquid crystal panel and the light source supporting portion.

The light source supporting portion may have four edges, and the rear chassis member may include four side surface portions extending from the four edges toward the front chassis member.

The at least one circuit board may be disposed on any of the four side surface portions.

The side surface portion on which the at least one circuit board is disposed may include a board mounting portion that is parallel to the liquid crystal panel.

The side surface portion on which the at least one circuit board is disposed may include a first connecting portion connecting one end of the board mounting portion with the light source supporting portion; and a second connecting portion connecting an opposite end of the board mounting portion with the front chassis member.

A distance between the board mounting portion and the liquid crystal panel may be shorter than a distance between the liquid crystal panel and the light source supporting portion.

The light source may include a light source substrate supported by the light source supporting portion of the rear chassis member and a plurality of light source elements disposed on a top surface of the light source substrate.

An area of the light source substrate may be substantially same as an area of the light source supporting portion and is configured to correspond to the area of the light source supporting portion.

A black coating may be applied to a border area of a top surface of the light source substrate to improve uniformity of light emitted from the plurality of light source elements.

The liquid crystal display apparatus may include a reflecting member configured to cover the rear chassis member to reflect light generated by the plurality of light source elements toward the liquid crystal panel.

The reflecting member may include a base cover portion configured to cover the light source supporting portion; and four side cover portions configured to cover the four side surface portions.

Each of the four side cover portions may be formed as a single plane.

The base cover portion may include a plurality of exposure holes to expose light from the plurality of light source elements toward the liquid crystal panel.

A border area of a top surface of the base cover portion may be covered by a black coating to improve uniformity of light emitted from the plurality of light source elements.

The light source substrate may have a shape of a zigzag bar, and the plurality of light source elements may be disposed in a zigzag pattern along the shape of the light source substrate.

Each of the plurality of light source elements may include an LED package.

An area of the light source supporting portion may be smaller than an area of each of the side surface portions.

A thermal diffusion sheet may be disposed between the at least one light source and the rear chassis member or in a portion of the rear chassis member adjacent to the light source.

The liquid crystal display apparatus may include only a single light source.

The liquid crystal display apparatus may further include an optical lens configured to cover the light source and to diffuse light emitted from the light source.

The at least one circuit board may include a control board configured to control the liquid crystal display apparatus; and a power board configured to drive the liquid crystal display apparatus.

In another aspect of the exemplary embodiments, a light source apparatus may be provided which may include at least one light source configured to supply light to a liquid crystal panel; a rear chassis member configured to accommodate the light source; and at least one circuit board configured to control the light source apparatus. The rear chassis member may include a light source supporting portion supporting the at least one light source; and a plurality of side surface portions extending from the light source supporting portion to the rear chassis member.

The at least one circuit board is disposed on at least one of the plurality of side surface portions. The light source supporting portion includes four edges, and the rear chassis member includes four side surface portions extending from the four edges toward the front chassis member.

The at least one circuit board is disposed on one of the four side surface portions. The side surface portion on which the at least one circuit board is disposed includes a board mounting portion that is parallel to the liquid crystal panel.

The side surface portion on which the at least one circuit board is disposed also includes a first connecting portion connecting one end of the board mounting portion with the light source supporting portion; and a second connecting portion connecting an opposite end of the board mounting portion with the front chassis member.

The light source includes a light source substrate supported by the light source supporting portion of the rear chassis member; and a plurality of light source elements disposed on a top surface of the light source substrate.

A reflecting member is provided and configured to cover the rear chassis member to reflect light generated by the plurality of light source elements toward the liquid crystal panel.

The light source substrate has a shape of a zigzag bar, and the plurality of light source elements is disposed in a zigzag pattern along the shape of the light source substrate.

Each of the plurality of light source elements may include an LED package.

The light source apparatus may include a single light source and an optical lens configured to cover the light source and to diffuse light emitted from the light source.

BRIEF DESCRIPTION OF THE DRAWINGS

These and/or other aspects and advantages will be more apparent and more readily appreciated from the following description of exemplary embodiments, taken in conjunction with the accompanying drawings in which.

DETAILED DESCRIPTION OF THE EXEMPLARY EMBODIMENTS

Figure 1:
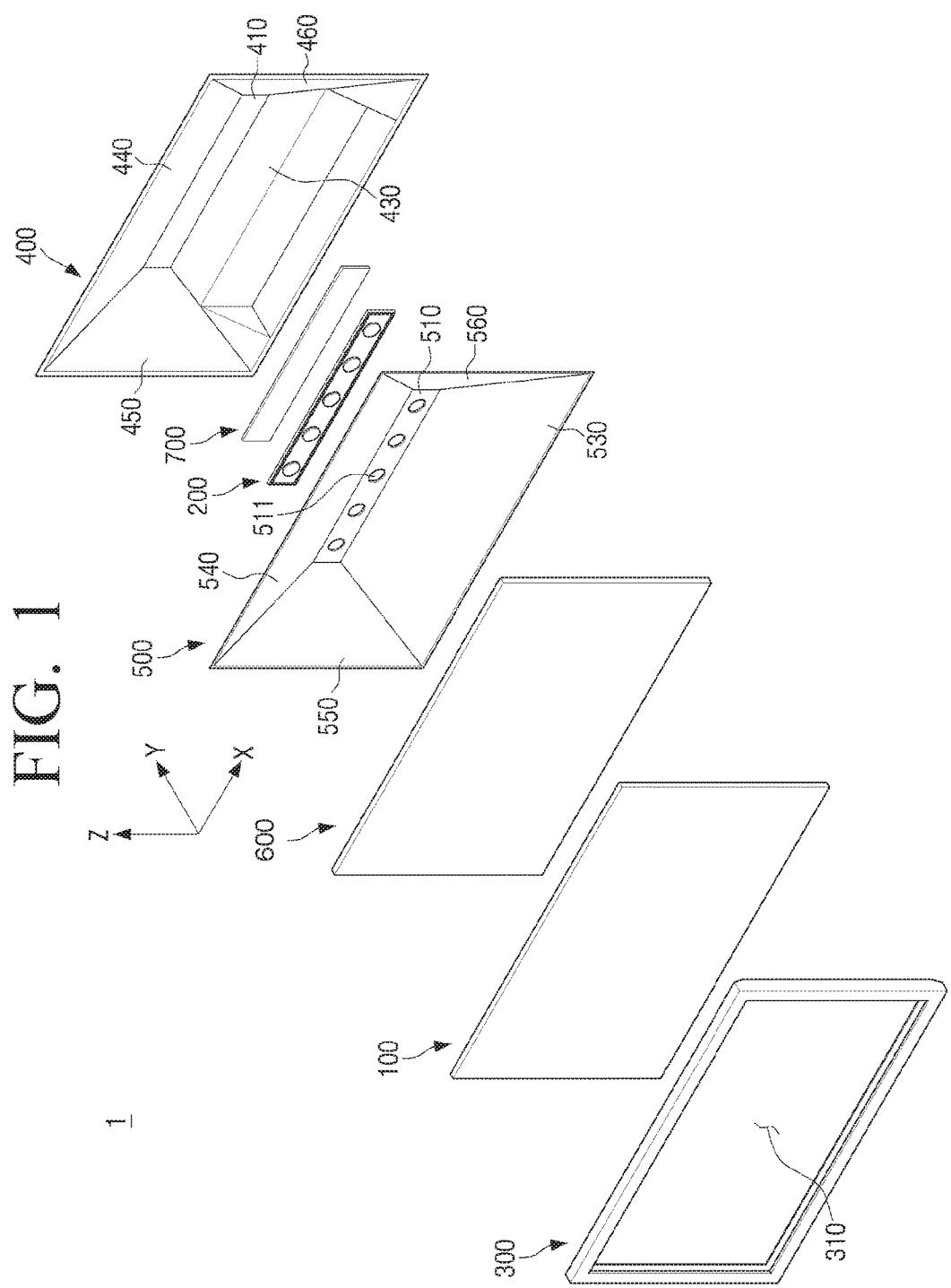
FIG. 1 is an exploded perspective view illustrating a liquid crystal display apparatus according to an exemplary embodiment.

Certain exemplary embodiments are described in greater detail below with reference to the accompanying drawings.

In the following description, the same drawing reference numerals are used for the same elements even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure exemplary embodiments with unnecessary detail.

Figure 2:
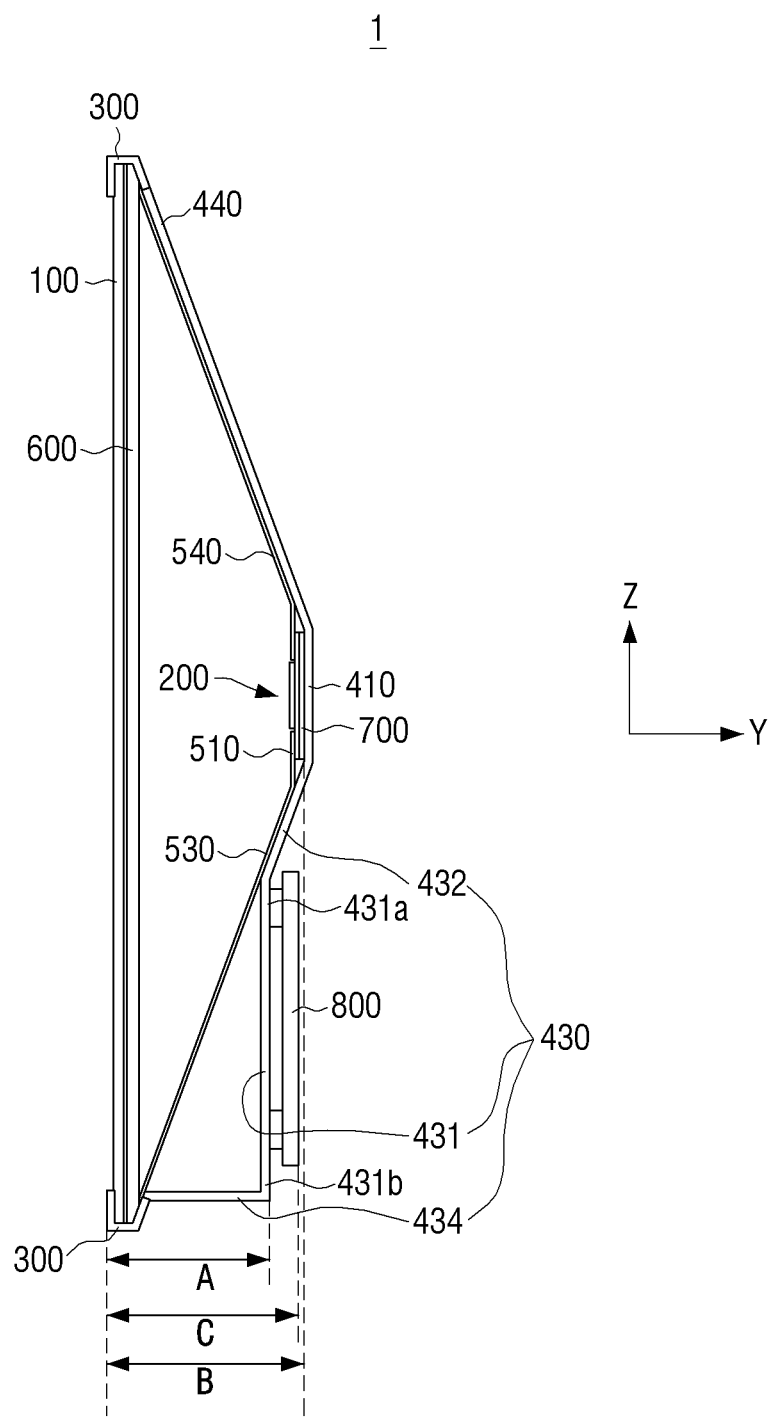
FIG. 2 is a side view of the liquid crystal display apparatus of FIG. 1.
Figure 3:
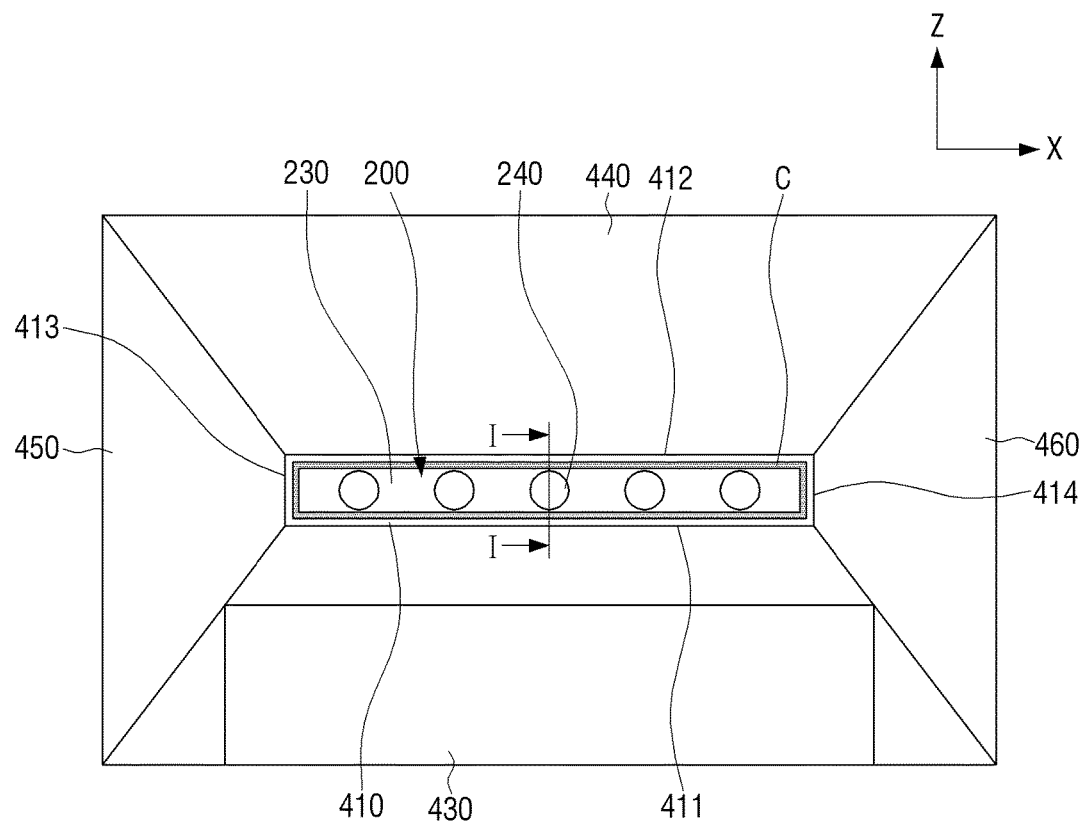
FIG. 3 is a view illustrating a front side of a rear chassis member of the liquid crystal display apparatus of FIG. 1.
Figure 4:
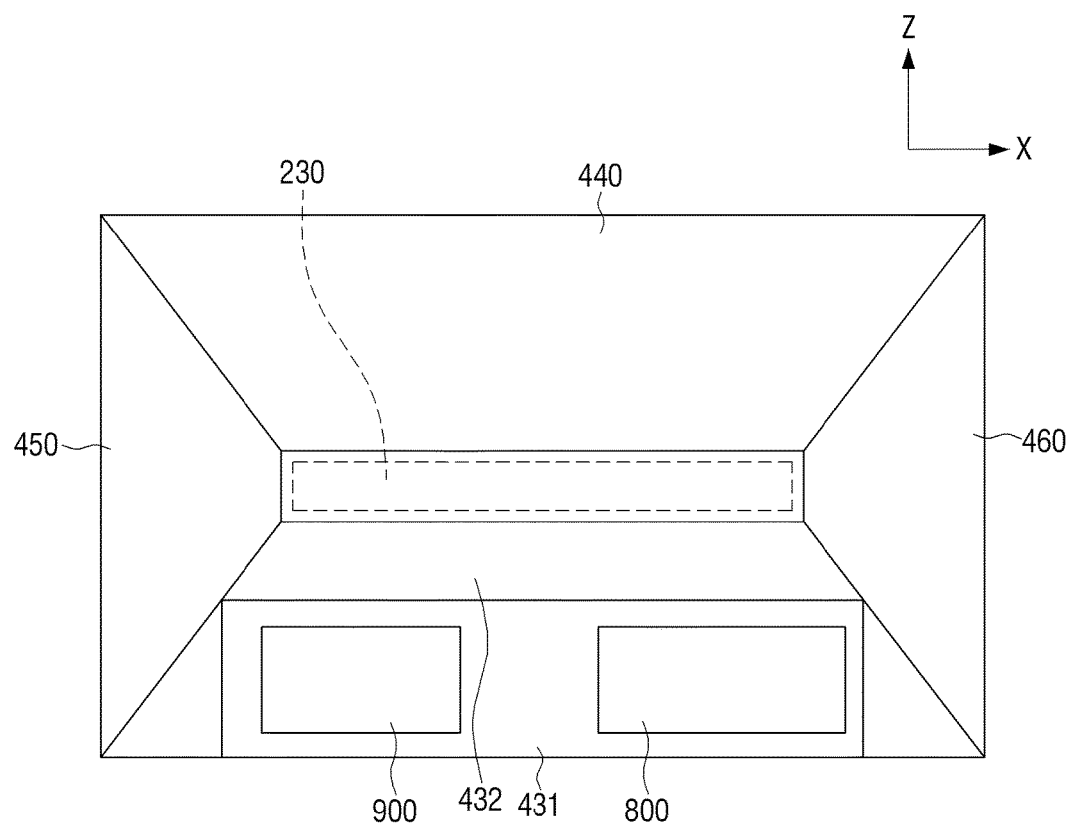
FIG. 4 is a view illustrating a rear side of a rear chassis member of the liquid crystal display apparatus of FIG. 1.
Figure 5:
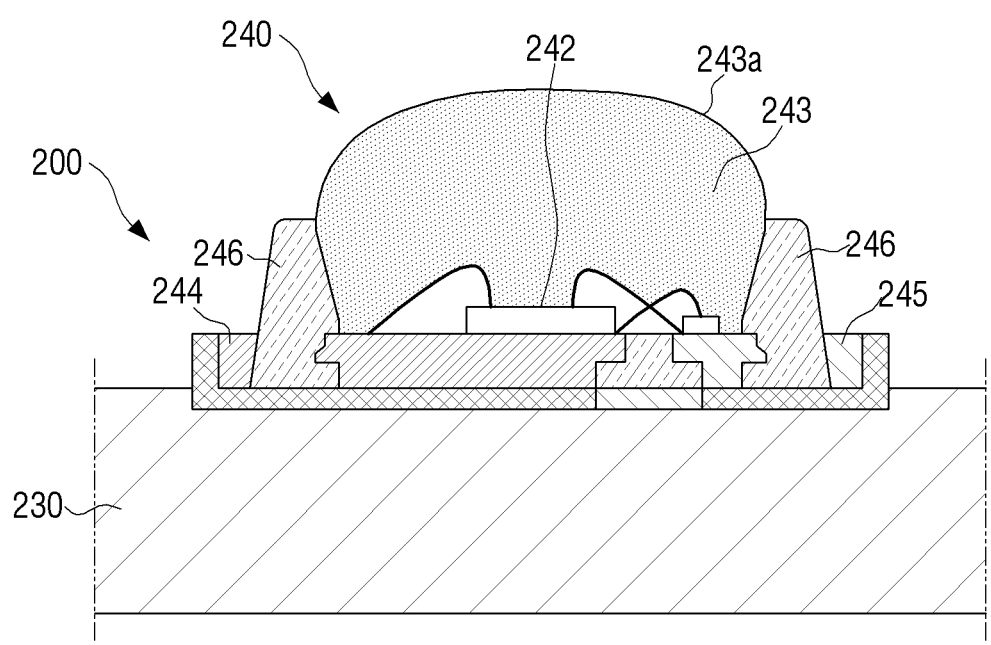
FIG. 5 is a partial sectional view illustrating the rear chassis member of FIG. 3 taken along a line I-I in FIG. 3.
Figure 6:
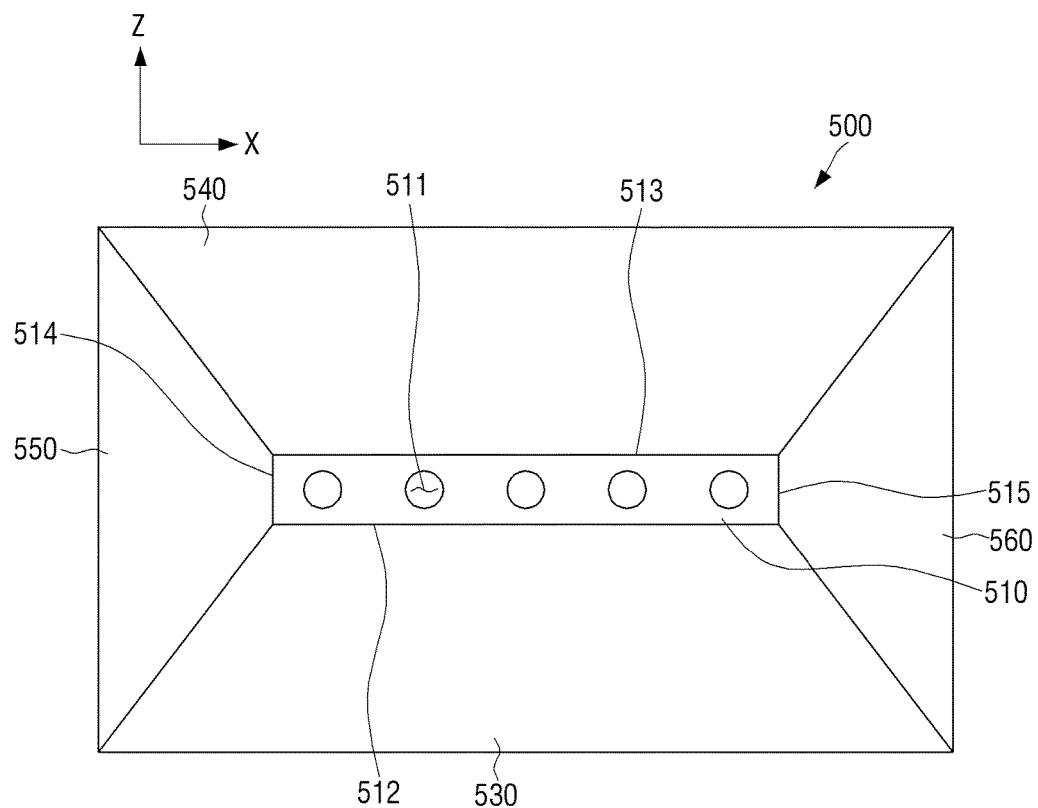
FIG. 6 is a plan view of a reflecting member of the liquid crystal display apparatus of FIG. 1.
Figure 7:
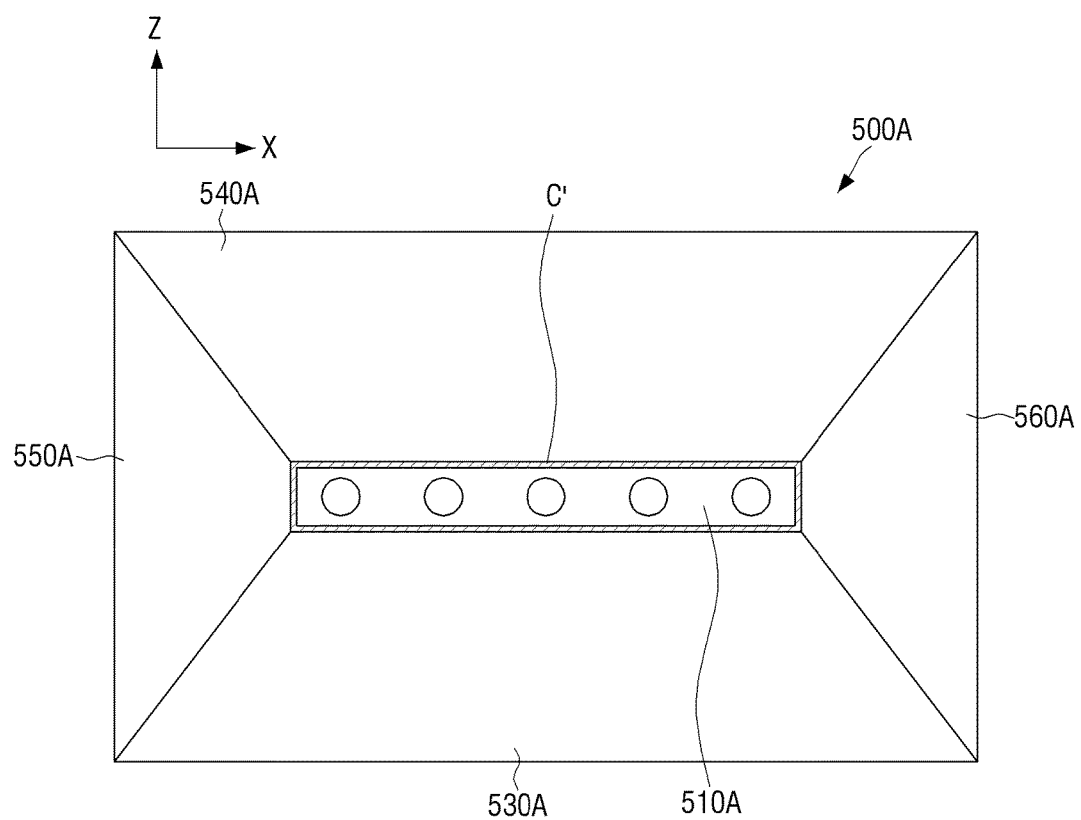
FIG. 7 is a plan view of a reflecting member according to another exemplary embodiment.

FIG. 1 is an exploded perspective view illustrating a liquid crystal display apparatus according to an exemplary embodiment. FIG. 2 is a side view of the liquid crystal display apparatus of FIG. 1. FIG. 3 is a view illustrating an inner surface of a rear chassis member of the liquid crystal display apparatus of FIG. 1, and FIG. 4 is a view illustrating an outer surface of a rear chassis member of the liquid crystal display apparatus of FIG. 1. FIG. 5 is a partial sectional view illustrating the rear chassis member of FIG. 3 taken along a line I-I in FIG. 3. FIG. 6 is a plan view of a reflecting sheet of the liquid crystal display apparatus of FIG. 1. FIG. 7 is a plan view of a reflecting sheet according to another exemplary embodiment.

Referring to FIGS. 1 to 6, a liquid crystal display apparatus 1 may include a liquid crystal panel 100, a light source 200, a front chassis member 300, a rear chassis member 400, a reflecting member 500, an optical sheet 600, a thermal diffusion sheet 700, and circuit boards 800 and 900.

The liquid crystal panel 100 displays color images using light that is provided by the light source 200. The liquid crystal panel 100 includes a color filter substrate (not illustrated) having a color filter layer, and a thin film transistor substrate (not illustrated) having thin film transistors. A liquid crystal (not illustrated) is provided between the color filter substrate and the thin film transistor substrate. The configuration of the liquid crystal panel 100 is already known, so the detailed description thereof is omitted.

The light source 200 is arranged in parallel to and behind the liquid crystal panel 100. In other words, the display apparatus with the arrangement of the light source 200 according to this exemplary embodiment is a direct type display apparatus. A light source 200 is mounted on a light source supporting portion 410 of the rear chassis member 400. In other words, in the exemplary embodiment, a single light source 200 is provided.

Referring to FIG. 3, the light source 200 includes a light source substrate 230 that is formed as a rectangular plate. The light source 200 may include a plurality of light source elements 240. The light elements 240 are mounted on a top surface of the light source substrate 230 and generate light.

The light source substrate 230 is mounted in a lengthwise direction (X direction) of the light source supporting portion 410 of the rear chassis member 400. The light source substrate 230 is formed as a rectangular plate. The light source substrate 230 supports the plurality of light source elements 240 that are mounted on the top surface of the light source substrate 230 and delivers electric power supplied from a power source (not illustrated) to the light source elements 240.

A black coating process is performed in a border area C of the top surface of the light source substrate 230. The black coating process may improve the uniformity of light emitted from the plurality of light source elements 240.

The plurality of light source elements 240 provide light to the liquid crystal panel 100. The light source elements 240 may be implemented as LED packages. Hereinafter, the light source elements 240 is referred to as the LED packages 240. The structure of each of the LED packages 240 is described with reference to FIG. 5.

FIG. 5 shows a light emitting diode 242 which is a component to generate light. A phosphor 243 converts light that has a specific color and that is generated by the light emitting diode 242 into light having a different color (e.g., a white color) that is suitable for being used as a light source. In addition, the phosphor 243 widely diffuses the light through an outer surface 243a which has a shape of a convex lens. Alternatively, an optical lens (not illustrated) disposed on the LED packages 240 may be used instead of the light diffusion of the phosphor 243. A pair of electrodes 244 and 245 is provided to electrically connect the light emitting diode 242 with the light source substrate 230. A frame 246 is a component to package the light emitting diode 242, the phosphor 243, and the pair of electrodes 244 and 245.

The front chassis member 300 is coupled to the rear chassis member 400 to form a space in which various components of the liquid crystal display apparatus 1 are accommodated. The front chassis member 300 has a front opening 310 which passes the images from the liquid crystal panel 100 to the outside.

The rear chassis member 400 includes the light source supporting portion 410 that supports the light source 200 and a plurality of side surface portions 430, 440, 450, and 460 that extend from the light source supporting portion 410 toward the front chassis member 300.

The light source supporting portion 410 is arranged along a direction (Z direction) parallel to the liquid crystal panel 100, and is formed in the form of a rectangular plate that is slightly wider than the light source substrate 230 to support the light source substrate 230. However, the light source supporting portion 410 is not limited in this embodiment. The light source supporting portion 410 may have an area substantially corresponding to the light source substrate 230 as long as it supports the light source substrate 230. In other words, the light source supporting portion 410 may have the size and shape substantially corresponding to the light source substrate 230.

The plurality of side surface portions 430, 440, 450, and 460 includes first, second, third, and fourth side surface portions 430, 440, 450, and 460. Each of the first to fourth side surface portions 430, 440, 450, and 460 extends from one of four edges 411, 412, 413, and 414 of the light source supporting portion 410 toward the front chassis member 300. The first to fourth side surface portions 430, 440, 450, and 460 have areas larger than the area of the light source supporting portion 410.

As shown in FIG. 2, the first side surface portion 430 includes a board mounting portion 431, a first connecting portion 432, and a second connecting portion 434.

The circuit boards 800 and 900 are provided to operate the liquid crystal display apparatus 1 and are mounted on the board mounting portion 431. The board mounting portion 431 is disposed along a direction (Z direction) parallel to the liquid crystal panel 100 like the light source supporting portion 410. In other words, the board mounting portion 431 is disposed parallel to the light source supporting portion 410. The circuit boards 800 and 900 are fixedly mounted onto the board mounting portion 431 through a soldering process, etc.

The board mounting portion 431 is provided at a position at which a distance A between the board mounting portion 431 and the liquid crystal panel 100 is shorter than a distance B between the liquid crystal panel 100 and the light source supporting portion 410. In more detail, the board mounting portion 431 is formed at a position at which a distance C between the circuit boards 800 and 900 and the liquid crystal panel 100 is shorter than or equal to the distance B between the liquid crystal panel 100 and the light source supporting portion 410. Accordingly, the circuit boards 800 and 900 that are mounted on the board mounting portion 431 may not project above the light source supporting portion 410 in the rear (Y direction) of the liquid crystal display apparatus 1. Accordingly, in the exemplary embodiment, even if the circuit boards 800 and 900 are mounted on the rear chassis member 400, the thickness of the liquid crystal display apparatus 1 may not be increased.

The first connecting portion 432 connects a first end 431a of the board mounting portion 431 with the light source supporting portion 410. The first connecting portion 432 integrally extends from the board mounting portion 431, and is integrally connected with the light source supporting portion 410.

The second connecting portion 434 connects a second end 431b of the board mounting portion 431 with the front chassis member 300. The second connecting portion 434 integrally extends from the board mounting portion 431, and is disposed perpendicular to the liquid crystal panel 100.

The reflecting member 500, as shown in FIG. 5, covers the rear chassis member 400 to reflect light generated by the plurality of light sources 240 toward the liquid crystal panel 100. The reflecting member 500 includes a base cover portion 510 to cover the light source supporting portion 410 and first to fourth side cover portions 530, 540, 550, and 560 to cover each of the first to fourth side surface portions 430, 440, 450, and 460.

The base cover portion 510 covers the light source module 200, and has a plurality of exposure holes 511 to expose the plurality of LED packages 240 toward the liquid crystal panel 100. The plurality of exposure holes 511 is formed in the base cover portion 510. The number of exposure holes 511 corresponds to the number of the plurality of LED packages 240.

Each of the first to fourth side cover portions 530, 540, 550, and 560 is formed as a single plane, and is formed to straightly extend from four edges 512, 513, 514, and 515 of the base cover portion 510 to the front chassis member 300. The first side cover portion 530 and the second side cover portion 540 facing the first side cover portion 530 have the same shape, and the third side cover portion 550 and the fourth side cover portion 560 facing the third side cover portion 550 have the same shape.

The first to fourth side-cover portions 530, 540, 550, and 560 concavely surround the plurality of LED packages 240 at a certain angle. The first side cover portion 530 and the second side cover portion 540 are provided at an angle of about 10 degrees to about 15 degrees between the first side cover portion 530 and the base cover portion 510, and between the second side cover portion 540 and the base cover portion 510. This structure allows the first to fourth side cover portions 530, 540, 550, and 560 to immediately reflect primary light emitted from the LED packages 240 in a direction of the liquid crystal panel 100.

In the exemplary embodiment, since direct reflection efficiency of the primary light emitted from the LED packages 240 in a direction of the liquid crystal panel 100 can be increased because of the configuration of the reflecting member 500, a single light source 200 can evenly supply light to the entire liquid crystal panel 100. Accordingly, because the liquid crystal display apparatus 1 according to the exemplary embodiment does not require a plurality of light sources 200, an increase in costs caused by mounting of a plurality of light sources 200 may be prevented.

The black coating process of the light source substrate 230 described above with regard to FIG. 3 may be applied to the reflecting member 500 instead of to the light source substrate 230. Referring to FIG. 7, the black coating process may be performed in a border area C' of a top surface of a base cover portion 510A of a reflecting member 500A. If the black coating is applied to the reflecting member 500A, light uniformity may be improved over the light uniformity obtained from black coating the light source substrate 230.

Referring again to FIG. 1, the optical sheet 600 is disposed between the liquid crystal panel 100 and the reflecting member 500. The optical sheet 600 may be provided with a plurality of sheets, such as a diffusion sheet, a prism sheet, etc. The optical sheet 600 diffuses the light emitted from the light source 200, and improves the brightness. The optical sheet 600 has a configuration that is already known, and a detailed description is omitted.

The thermal diffusion sheet 700 is provided between the light source module 200 and the rear chassis member 400 to diffuse heat emitted from the light source 200. The thermal diffusion sheet 700 may be implemented as a graphite sheet with excellent heat diffusion efficiency. The thermal diffusion sheet 700 may be formed in a shape corresponding to the light source substrate 230 of the light source 200. However, this is merely one exemplary embodiment. The thermal diffusion sheet 700 may also be formed larger than the light source substrate 230 in order to increase the heat diffusion efficiency. In other words, the thermal diffusion sheet 700 may be formed at a wide range in a portion adjacent to the light source module of the rear chassis member.

The circuit board 800 may be implemented as a control board and the circuit board 900 may be implemented as a power board. The control board controls the liquid crystal display apparatus 1, and the power board drives the liquid crystal display apparatus 1. The control board and power board are mounted on the board mounting portion 431 as described above.

In the liquid crystal display apparatus 1 according to the exemplary embodiment, the circuit boards 800 and 900 are disposed in front (-Y direction) of the light source supporting portion 410 that is protruded in the rear direction (Y direction) of the liquid crystal display apparatus 1 so that an additional increase in the thickness of the liquid crystal display apparatus 1 due to the mounting of the circuit boards 800 and 900 may be prevented.

Accordingly, the liquid crystal display apparatus 1 according to the present embodiment may be implemented as a slimmer liquid crystal display apparatus 1.

Figure 8:
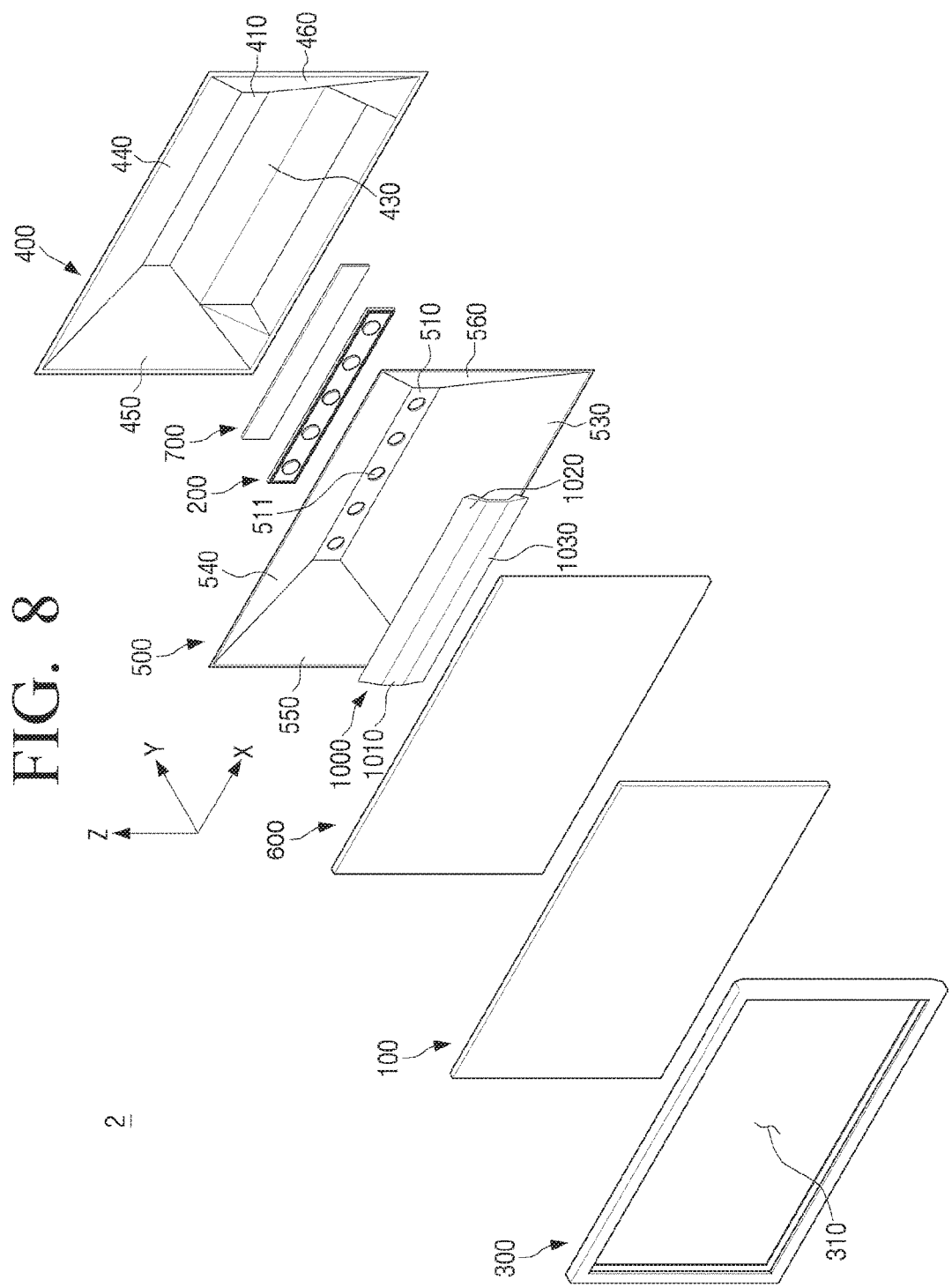
FIG. 8 is an exploded perspective view illustrating a liquid crystal display apparatus according to another exemplary embodiment.
Figure 9:
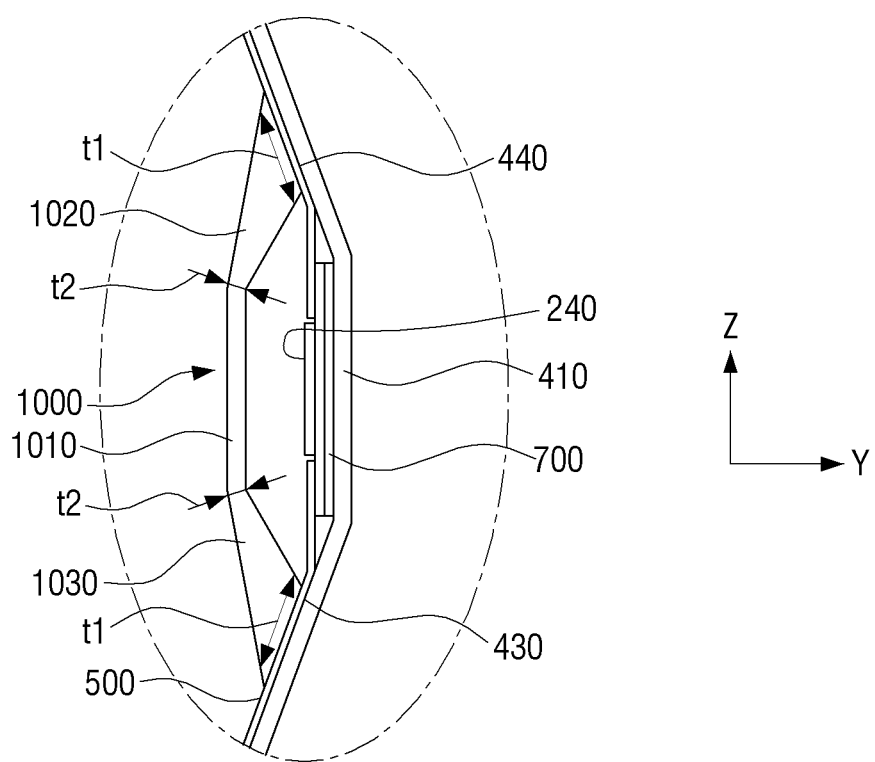
FIG. 9 is a sectional view illustrating a main portion of the liquid crystal display apparatus of FIG. 8.

FIG. 8 is an exploded perspective view illustrating a liquid crystal display apparatus according to another exemplary embodiment, and FIG. 9 is a sectional view illustrating a main portion of the liquid crystal display apparatus of FIG. 8.

Referring to FIG. 8, a liquid crystal display apparatus 2 may include a liquid crystal panel 100, a light source module 200, a front chassis member 300, a rear chassis member 400, a reflecting member 500, an optical sheet 600, a thermal diffusion sheet 700, circuit boards (not illustrated), and an optical lens 1000.

The liquid crystal panel 100, the light source module 200, the front chassis member 300, the rear chassis member 400, the reflecting member 500, the optical sheet 600, the thermal diffusion sheet 700, and the circuit boards (not illustrated) are substantially the same as the configurations of the foregoing embodiment, and detailed descriptions are omitted.

The optical lens 1000 is provided to diffuse light coming from the light source 200, and is mounted on the reflecting member 500. The optical lens 1000 is concavely formed to surround the light source 200.

Referring to FIG. 9, the optical lens 1000 may include a first lens portion 1010 that is disposed in a front direction (-Y direction) of the LED package 240, and second and third lens portions 1020 and 1030 that extend from the first lens portion 1010 in a direction of the reflecting member 500, respectively.

The second and third lens portions 1020 and 1030 are formed to extend from the first lens portion 1010 in a direction of the reflecting member 500, and the thickness of the second and third lens portions 1020 and 1030 is increased. The second and third lens portions 1020 and 1030 are formed so that a thickness t1 of a portion near the reflecting member 500 is thicker than a thickness t2 of a portion far from the reflecting member 500. The structure of the second and third lens portions 1020 and 1030 may further increase the diffusion efficiency of the light passing through the second and third lens portions 1020 and 1030.

The liquid crystal display apparatus 2 according to the exemplary embodiment may further increase light diffusion efficiency through the optical lens 1000 for diffusing light.

Figure 10:
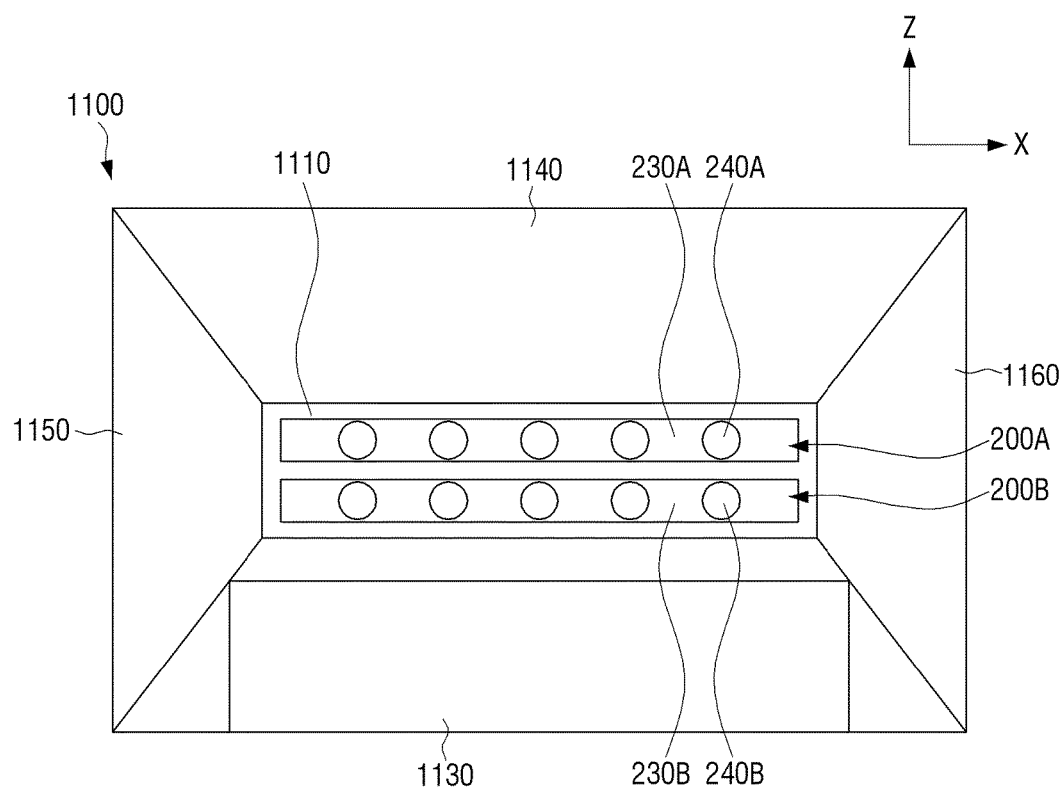
FIG. 10 is a view illustrating a light source and a rear chassis member according to another exemplary embodiment.

FIG. 10 is a view illustrating a light source and a rear chassis member according to another exemplary embodiment.

A liquid crystal panel (not illustrated), a front chassis member (not illustrated), a reflecting member (not illustrated), an optical sheet (not illustrated), a thermal diffusion sheet (not illustrated), and circuit boards (not illustrated) are substantially the same as in the other exemplary embodiments and detailed descriptions are omitted.

Referring to FIG. 10, a rear chassis member 1100 may include a light source supporting portion 1110 and first to fourth side surface portions 1130, 1140, 1150, and 1160.

The light source supporting portion 1110 supports two light sources 200A and 200B unlike the other exemplary embodiments. The light source supporting portion 1110 is formed in an area larger than the light source supporting portion 410 shown in FIG. 3. The two light sources 200A and 200B are spaced apart from each other on the light source supporting portion 410 at a predetermined distance.

In the exemplary embodiment, since a plurality of light sources 200A and 200B is provided, the efficiency of light supplied to the liquid crystal panel may be more increased.

Figure 11:
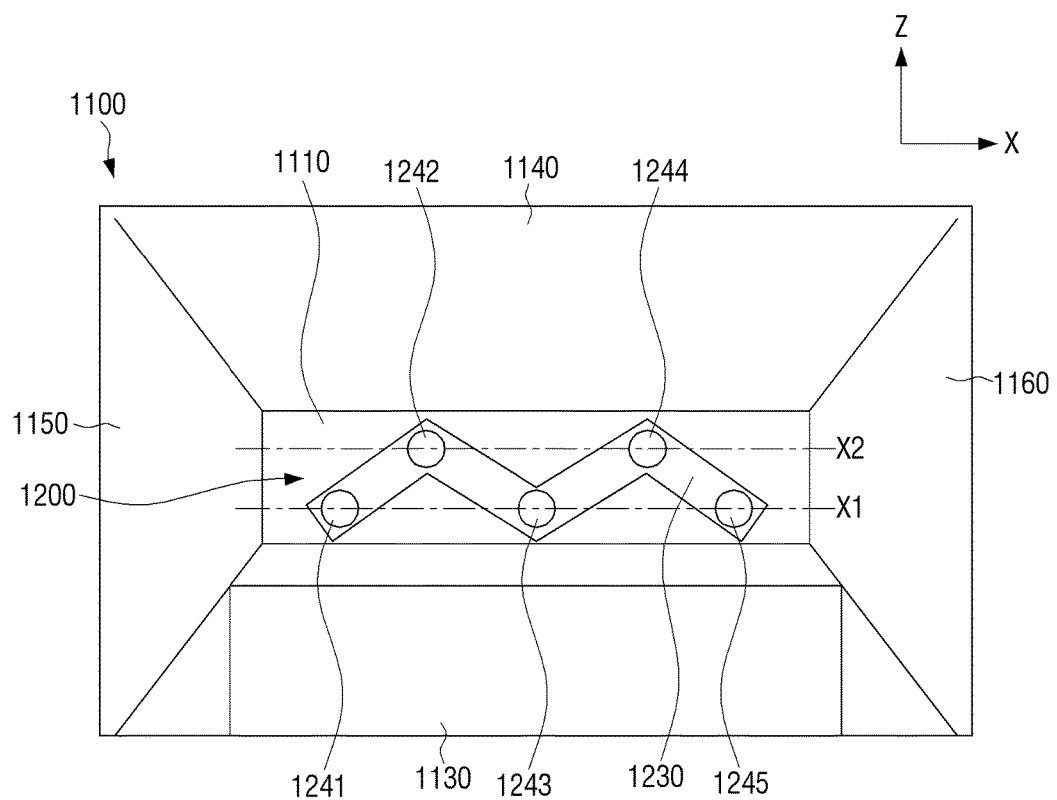
FIG. 11 is a view illustrating a light source and a rear chassis member according to another exemplary embodiment.

FIG. 11 is a view illustrating a light source and a rear chassis member according to another embodiment.

A liquid crystal panel (not illustrated), a front chassis member (not illustrated), a reflecting member (not illustrated), an optical sheet (not illustrated), a thermal diffusion sheet (not illustrated), and circuit boards (not illustrated) are substantially the same as in the other exemplary embodiments and detailed descriptions are omitted.

Referring to FIG. 11, a rear chassis member 1100 may include a light source supporting portion 1110 and first to fourth side surface portions 1130, 1140, 1150, and 1160. The light source supporting portion 1110 supports a single light source module 1200 unlike the foregoing embodiment.

The light source module 1200 may include a light source substrate 1230 and a plurality of LED packages 1241, 1242, 1243, 1244, and 1245 that are disposed on a top surface of the light source substrate 1230 to generate light.

The light source substrate 1230 is formed in the shape of a zigzag bar along a lengthwise direction (X direction) of the light source supporting portion 1110. The plurality of LED packages 1241, 1242, 1243, 1244, and 1245 are disposed in a zigzag pattern along the shape of the light source substrate 1230. In detail, odd-numbered LED packages 1241, 1243, and 1245 from the left side of the light source substrate 1230 are disposed along a first axial direction X1 that is along the lengthwise direction (X direction) of the light source supporting portion 1110, and even-numbered LED packages 1242 and 1244 from the left side of the light source substrate 1230 are disposed along a second axial direction X2 parallel to the first axial direction X1.

In the exemplary embodiment, the plurality of LED packages 1241, 1242, 1243, 1244, and 1245 may be disposed in two rows in the two axial directions X1 and X2 along the light source substrate 1230 in a shape of a zigzag bar. Accordingly, in the exemplary embodiment, the single light source 1200 can evenly supply light toward the liquid crystal panel similar to the light provided by the plurality of light sources.

Although some exemplary embodiments have been shown and described, exemplary embodiments are not limited thereto. It would be appreciated by those skilled in the art that changes may be made in these exemplary embodiments without departing from the principles and spirit of the disclosure, the scope of which is defined in the claims and their equivalents.

What is claimed is:

1. A liquid crystal display apparatus comprising:
a liquid crystal panel configured to display images;
at least one light source configured to supply light to the liquid crystal panel;
a front chassis member and a rear chassis member configured to accommodate the liquid crystal panel and the light source, respectively; and
at least one circuit board configured to control the liquid crystal display apparatus,
wherein the rear chassis member comprises:
a light source supporting portion configured to support the at least one light source; and
a plurality of side surface portions extending from the light source supporting portion to the front chassis member, and
wherein the at least one circuit board is disposed in one of the plurality of side surface portions, and
wherein a distance between the at least one circuit board and the liquid crystal panel is shorter than a distance between the liquid crystal panel and the light source supporting portion.

2. The liquid crystal display apparatus of claim 1, wherein the light source supporting portion comprises four edges, and the plurality of side surface portions comprises four side surface portions extending from the four edges toward the front chassis member.

3. The liquid crystal display apparatus of claim 2, wherein the light source comprises:
a light source substrate supported by the light source supporting portion of the rear chassis member; and
a plurality of light source elements disposed on a top surface of the light source substrate.

4. The liquid crystal display apparatus of claim 3, wherein an area of the light source substrate is configured to correspond to an area of the light source supporting portion.

5. The liquid crystal display apparatus of claim 3, wherein a black coating is applied to a border area of a top surface of the light source substrate to improve uniformity of light emitted from the plurality of light source elements.

6. The liquid crystal display apparatus of claim 3 further comprising:
a reflecting member configured to cover the rear chassis member to reflect light generated by the plurality of light source elements toward the liquid crystal panel.

7. The liquid crystal display apparatus of claim 6, wherein the reflecting member comprises:
a base cover portion configured to cover the light source supporting portion; and
four side cover portions configured to cover the four side surface portions.

8. The liquid crystal display apparatus of claim 7, wherein each of the four side cover portions is formed as a single plane.

9. The liquid crystal display apparatus of claim 7, wherein the base cover portion comprises a plurality of exposure holes to expose light from the plurality of light source elements toward the liquid crystal panel.

10. The liquid crystal display apparatus of claim 7, wherein
a border area of a top surface of the base cover portion is covered by a black coating to improve uniformity of light emitted from the plurality of light source elements.

11. The liquid crystal display apparatus of claim 3, wherein
the light source substrate comprises a shape of a zigzag bar, and
the plurality of light source elements is disposed in a zigzag pattern along the shape of the light source substrate.

12. The liquid crystal display apparatus of claim 3, wherein
each of the plurality of light source elements comprises an LED package.

13. The liquid crystal display apparatus of claim 1, wherein
an area of the light source supporting portion is smaller than an area of each of the plurality of side surface portions.

14. The liquid crystal display apparatus of claim 1, wherein
a thermal diffusion sheet is disposed between the at least one light source and the rear chassis member or in a portion of the rear chassis member adjacent to the light source.

15. The liquid crystal display apparatus of claim 1, wherein the liquid crystal display apparatus comprises a single light source.

16. The liquid crystal display apparatus of claim 1 further comprising:
an optical lens configured to cover the light source and to diffuse light emitted from the light source.

17. The liquid crystal display apparatus of claim 1, wherein
the at least one circuit board comprises:
a control board configured to control the liquid crystal display apparatus; and
a power board configured to drive the liquid crystal display apparatus.

18. The liquid crystal display apparatus of claim 1, wherein
the at least one of the plurality of side surface portions comprises a board mounting portion that is parallel to the liquid crystal panel.

19. The liquid crystal display apparatus of claim 18, wherein the at least one of the plurality of side surface portions comprises:
a first connecting portion connecting one end of the board mounting portion with the light source supporting portion; and
a second connecting portion connecting an opposite end of the board mounting portion with the front chassis member.

20. The liquid crystal display apparatus of claim 18, wherein
a distance between the board mounting portion and the liquid crystal panel is shorter than a distance between the liquid crystal panel and the light source supporting portion.

* * * * *